Patented Dec. 1, 1925.

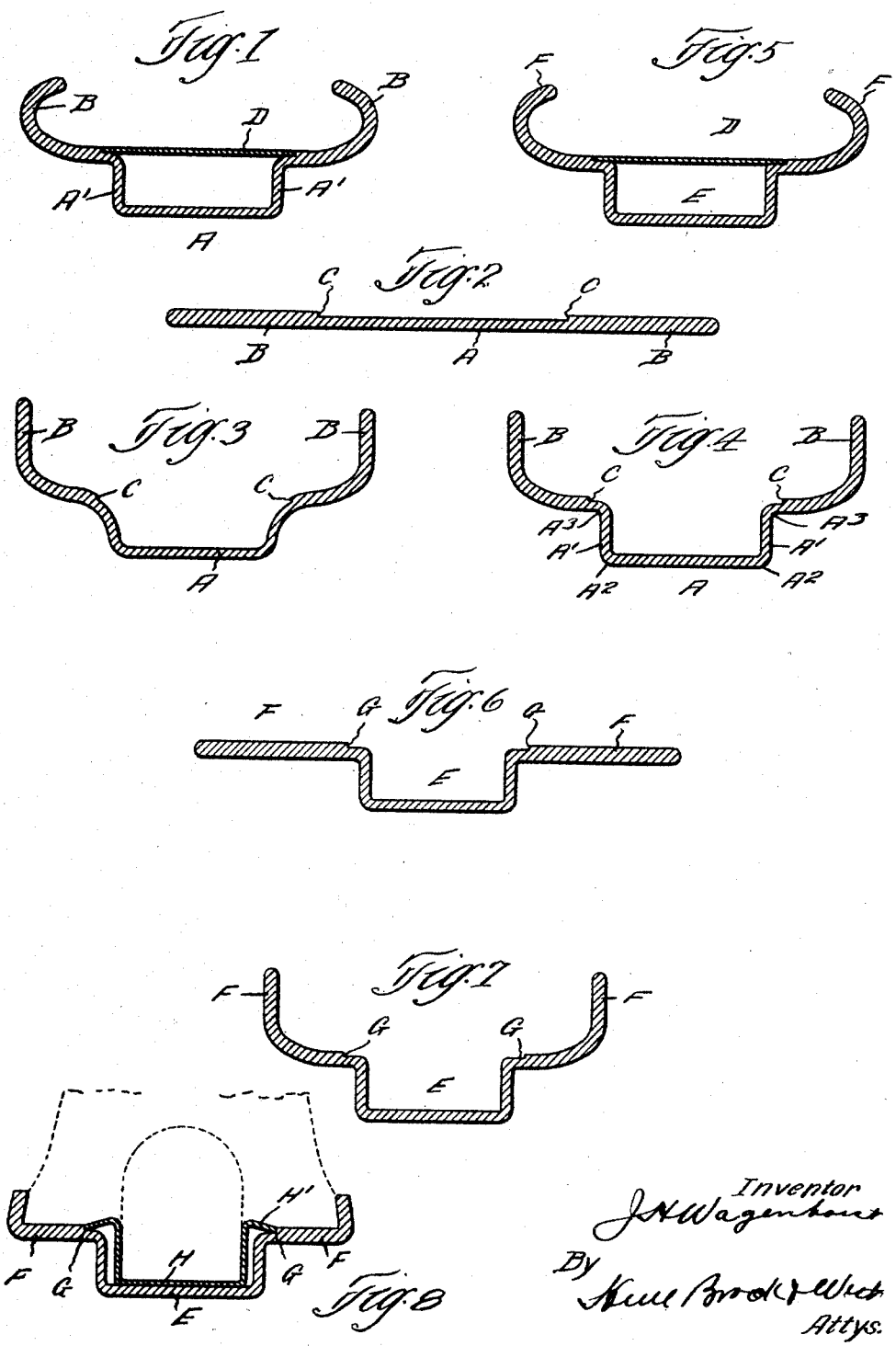
Dec. 1, 1925.  J. H. WAGENHORST  1,563,811
RIM FOR TIRES AND METHOD OF MAKING THE SAME
Filed March 3, 1924

1,563,811

UNITED STATES PATENT OFFICE.

JAMES H. WAGENHORST, OF JACKSON, MICHIGAN.

RIM FOR TIRES AND METHOD OF MAKING THE SAME.

Application filed March 3, 1924. Serial No. 696,499.

*To all whom it may concern:*

Be it known that I, JAMES H. WAGENHORST, a citizen of the United States, residing at Jackson, in the county of Jackson and State of Michigan, have invented a certain new and useful Improvement in Rims for Tires and Methods of Making the Same, of which the following is a full, clear, and exact description, reference being had to the accompanying drawings.

This invention relates generally to automobile wheels and more particularly to the fixed rim constituting a part of the wheel body, and to which the automobile tire is attached.

This fixed rim is made from sheet metal and is what is known as a drop-base rim. The present invention is in the nature of an improvement upon the rim shown and described in my Patent No. 1,316,606, dated September 23, 1919.

At the present time cushion tires are employed for both light weight and heavy weight trucks and some of these cushion tires are formed with a centrally disposed air space which imparts a considerable resiliency to a cushion tire of ample dimensions for supporting the load which it is intended to carry.

The present invention relates to a drop base rim particularly adapted for light weight trucks, although the principle of the invention can be applied to wheels intended for use upon heavy weight trucks.

The object of the invention is to provide a sheet metal rim in which the metal will be so distributed that strength will be provided where strength is needed, and the remainder of the stock so proportioned that the rolling processes can be quickly and easily carried out without fracturing the metal.

Another object of the invention is to provide a suitably shaped stock for the formation of the rim of such construction that this stock when shaped into the rim will provide suitable bearing surfaces or shoulders for positioning the filler band within the fixed rim or felly.

The leading object of my present invention is to provide a rim of the drop base type, in which the felly or fixed rim forms a part of the tire carrying rim with a consequent elimination of the usual felly, of such construction that there is a considerable economy in cost and weight produced by so distributing the metal that greater thickness of metal will be provided at the points where needed and lesser thickness at other points.

The invention consists in the novel features of construction and in the manner of combining and arranging the same all of which will be fully described hereinafter and set forth in the appended claims. The invention consists also in the improved process of making the rim.

In the drawings forming part of this specification Fig. 1 is a transverse sectional view of a rim together with the filler strip or band arranged therein; Fig. 2 is a transverse sectional view of the stock from which the rim shown in Fig. 1 is formed; Fig. 3 is a detail sectional view showing the first step in the formation of the rim from this stock; Fig. 4 is a similar view showing the second step and Fig. 5 is a sectional view showing the completed structure from the stock shown in Fig. 6; Fig. 6 is a sectional view of a slightly modified form of stock; Fig. 7 is a sectional view showing the first step in the formation of the rim from the stock shown in Fig. 6; and Fig. 8 is a detail sectional view showing the completed rim with a channel filler arranged therein.

In constructing a drop base rim in accordance with my invention I employ a strip of sheet metal of suitable length and cross sectional shape such as shown in Fig. 2. It will be noted that the central portion A of this stock is somewhat thinner than the side portions B, and that well defined shoulder portions C are provided upon the outer face thereof at the juncture of the portions A and B.

This strip of metal is bent into circular form and the ends welded together in any suitable manner. The circular band thus formed is then given the first rolling to give it the shape shown in Fig. 3, that is, the central portion A is pressed inwardly and the outer portions B are turned outwardly as shown, and then in the next rolling the central portion A is formed with parallel side walls A' and the side or end portions B are brought inwardly to provide the tire retaining flanges which may be clincher as shown in Fig. 1; or straight side.

In the formation of the rim the shoulders C are disposed upon opposite sides of the drop base portion A and it will be noted that these shoulders are located a short distance away from each side of the side walls A' of the impressed portion or drop base of the rim.

The rim constructed in this manner has the tire retaining flanges B of greater thickness than the base portion of the rim and is therefore given sufficient strength to withstand the strains to which these portions are subjected while the central portion being of less thickness has the proper rigidity imparted thereto by bending at the points A² and A³.

The shoulders C provide opposite bearing points for the filler strip D which is inserted in the rim. The rim thus constructed is ready for use in connection with either a pneumatic or cushion tire.

In case a pneumatic tire is employed the filler strip D will prevent the inner tube being forced down into the drop base of the rim into contact with the ends of the spokes.

In this connection it will be understood that suitable openings will be punched in the base of the rim and if desired the metal surrounding the spokes can be carried outwardly to provide suitable sockets or the openings can be punched without such carrying outwardly of the metal as just described. Inasmuch as the present invention pertains to the structural formation of the rim, the spokes and the sockets have been omitted from the drawing. It will also be understood that either wooden or metal spokes can be employed, and if desired the sheet metal rim can be attached to the disk portion of a wheel.

In Fig. 6 I have shown a slightly different form of stock from which the rim is formed, the stock in this instance consisting of the channel shaped portion E having oppositely disposed lateral extending portions F and it will be noted that the portions F are considerably thicker than the walls and base of the channel shaped portion E.

It will also be noted that well defined shoulders G are provided adjacent the points where the thick lateral portions F unite with the thinner channeled portion E.

The sheet metal stock of this formation is shaped into a circular band and welded as previously described and then the first rolling process gives it the shape indicated in Fig. 7 and the further rolling operation gives to the sheet metal rim the channel shape which may be such as described in Fig. 8 or it may be rolled to the cross sectional shape shown in Figs. 1 or 5.

Instead of the flat filler strip D shown in Figs. 1 and 5 I may employ a filler strip H which seats in the drop base portions E and the laterally disposed wings or flanges H' contact with the shoulders G as most clearly shown in Fig. 8.

As previously stated, a rim such as shown in Figs. 1 to 5 can be used in connection with either pneumatic or cushion tires, and the same thing is true of the rim formed from the stock such as shown in Fig. 6. In Fig. 8 however, I have constructed the filler especially for use in connection with a cushion tire having a centrally disposed air space.

When cushion tires are employed they will be vulcanized directly upon the rim of the wheel and the fillers not only protect against contact with the spoke ends, but also serve to fill up a part of the space so that a minimum amount of rubber compound is required as it is obvious that from Figs. 1 and 5 the rubber compound would be forced into the inwardly projecting portion of the rim, and in the construction shown in Fig. 8 the oppositely disposed flange portions contacting with the shouldered portions of the base will provide for positioning a core which is inserted for the purpose of forming the centrally disposed air chamber in the cushion tire, it being understood that the core is placed in the channeled filler as indicated in dotted lines, and that the cushion tire is then molded over this core, and after the vulcanization operation has been completed the core is dissolved by the application of steam or water through openings (not shown) cut in the base of the rim and the filler H. The shape of the filler gives it ample strength to withstand the pressures to which the various parts are subjected during the molding and vulcanizing operations.

The stock therefore is specially formed with the idea of proper distribution of metal both for strength and ease of fabrication.

It will of course be understood that the sheet metal rim formed from the stock shown in Fig. 6 can be used in connection with wooden or metal spokes or can be applied to a disk if so desired, and the construction and arrangement of the spokes or rivet holes can be made as desired.

It will thus be seen that I provide a novel construction of drop base rim that is capable of carrying out all of the various objects hereinbefore referred to, and it will also be noted that I provide a novel process for making a rim embodying the hereinbefore mentioned characteristics.

Having thus described my invention, what I claim is:—

1. A rim for a wheel body comprising an inwardly extending portion, and oppositely disposed tire engaging flanges, the said flanges being of greater thickness than the said central portion, said flanges being provided with oppositely disposed shoulders; and a filler inserted in said rim and having its edges in engagement with said shoulders.

2. A rim for a wheel body comprising an inwardly extending portion and oppositely disposed tire engaging flanges, said central portion being of less thickness than the said flanges, oppositely disposed shoulders formed upon the outer face of the rim upon opposite sides of the central portion and a filler inserted in said rim and having oppositely disposed wings or flanges engaging said shoulders.

3. A rim comprising a channel-shaped drop base portion and flanges integral with said drop base portion extending laterally from the outer edges of the side walls of said portion to form seats for the tire beads and tire engaging flanges, said laterally extending flanges being of greater metal thickness than the drop base portion of the rim.

4. A rim formed from metal stock having a central zone and zones at each side of the central zone of greater thickness than said central zone, said central zone being depressed to form a channel-shaped drop base portion and said side zones being formed into tire-engaging flanges.

In testimony whereof, I hereunto affix my signature.

JAMES H. WAGENHORST.